US008879040B2

(12) United States Patent
Tajima

(10) Patent No.: US 8,879,040 B2
(45) Date of Patent: Nov. 4, 2014

(54) ACTIVE MATRIX SUBSTRATE AND DISPLAY DEVICE

(75) Inventor: Yoshimitsu Tajima, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 134 days.

(21) Appl. No.: 13/700,280

(22) PCT Filed: Apr. 15, 2011

(86) PCT No.: PCT/JP2011/059419

§ 371 (c)(1),
(2), (4) Date: Dec. 6, 2012

(87) PCT Pub. No.: WO2011/148734

PCT Pub. Date: Dec. 1, 2011

(65) Prior Publication Data

US 2013/0077007 A1    Mar. 28, 2013

(30) Foreign Application Priority Data

May 28, 2010  (JP) .................................. 2010-122361

(51) Int. Cl.
*G02F 1/1345*    (2006.01)
*G02F 1/1362*    (2006.01)

(52) U.S. Cl.
CPC ........ *G02F 1/136286* (2013.01); *G02F 1/1345* (2013.01); *G02F 1/136204* (2013.01); *G02F 1/13458* (2013.01)
USPC .............................. 349/149; 349/152; 349/40

(58) Field of Classification Search
CPC . G02F 11/1333; G02F 1/133345; F24F 11/02
USPC ........................................... 349/40, 149, 152
See application file for complete search history.

(56) References Cited

U.S. PATENT DOCUMENTS

| 6,346,976 | B1* | 2/2002 | Komeno et al. ................ 349/139 |
| 6,686,768 | B2* | 2/2004 | Comer ............................ 326/38 |
| 2005/0195338 | A1* | 9/2005 | Matsumoto et al. ............ 349/40 |
| 2008/0029784 | A1* | 2/2008 | Lim et al. ....................... 257/203 |
| 2009/0027606 | A1* | 1/2009 | Nakanishi ...................... 349/143 |
| 2010/0163284 | A1* | 7/2010 | Tanahara ....................... 174/255 |

FOREIGN PATENT DOCUMENTS

| JP | H02-251817 A | 10/1990 |
| JP | H04-221926 A | 8/1992 |
| JP | 8-248440 A | 9/1996 |
| JP | 10-062735 * | 3/1998 ............... G02F 1/13 |
| JP | H10-62735 A | 3/1998 |

* cited by examiner

*Primary Examiner* — Edward Glick
*Assistant Examiner* — Sang V Nguyen
(74) *Attorney, Agent, or Firm* — Chen Yoshimura LLP

(57) ABSTRACT

Disclosed is an active matrix substrate (1) including thereon: a plurality of signal lines (2); a plurality of scan lines (3) that intersect the signal lines (2); switching elements (4) disposed near intersections of the signal lines (2) and the scan lines (3); a plurality of input terminals (7) for inputting signals to the signal lines (2) and scan lines (3); and short-circuit wiring (8) disposed in an outer area with respect to the input terminals (7), where the short-circuit wiring (8) includes a trunk wiring line (8a) and a plurality of branch wiring lines (8b) that branch off from the trunk wiring line (8a) and that are connected to the respective input terminals (7), and a plurality of separator sections (9) are provided on the short-circuit wiring (8). The separator sections (9) electrically isolate the individual input terminals (7) and the trunk wiring line (8a) from each other.

10 Claims, 7 Drawing Sheets

ACTIVE MATRIX SUBSTRATE AND DISPLAY DEVICE

TECHNICAL FIELD

The present invention relates to an active matrix substrate and a display device. More particularly, the present invention relates to an active matrix substrate that facilitates the implementation of a countermeasure against static electricity generated during the manufacturing process and that allows easy repairs of broken lines, and also relates to a display device equipped with such an active matrix substrate.

BACKGROUND ART

Liquid crystal display panels of active matrix type drive system include, for example, an active matrix substrate (also referred to as TFT array substrate) that includes thin film transistors (hereinafter referred to as TFTs) disposed in individual pixels as switching elements, where the pixel is the smallest unit of an image; an opposite substrate disposed facing the active matrix substrate; and a liquid crystal layer interposed between these substrates.

The active matrix substrate can be inspected in two ways: one is the electrical inspection conducted on a large unseparated active matrix substrate, and the other is the optical inspection on individually separated panels.

An individually separated panel can be examined for defects by comparing the light amounts transmitted under the light projected from a backlight or the like, while voltages are applied to the liquid crystal layer interposed between the active matrix substrate and the opposite substrate.

However, defects found on the active matrix substrate may not be repaired perfectly due to the presence of the opposite substrate. Also, any foreign matter generated as a result of the repair can remain inside the panel, which can lead to another defect.

Defects found on a large unseparated active matrix substrate can, in many cases, be completely repaired. Any foreign matter generated as a result of the repair can be removed, and the alignment film is not damaged, because the repair process in this case handles only the active matrix substrate.

Also, when an inspection is conducted on a large unseparated active matrix substrate, because the inspection is conducted shortly after the manufacturing of the active matrix substrate, useful information for tracking and reflecting the manufacturing process conditions can be obtained, and that information can be used for quality control.

Inspection of a large unseparated active matrix substrate can be conducted in methods such as the array inspection method, where electrical charge amount inputted to individual pixels is read out via a reverse path, and the contactless inductive power transmission method (abbreviated as IPT), where the voltage value at the pixel electrode is read out by placing a needle-shaped electrode very close to the pixel electrode but without touching it.

Array inspection, however, is used for display devices that are mainly for compact and portable applications. This is because, due to development trend of those display devices to increase a number of pixels formed in the same space, i.e., higher resolution, the needle-like electrode used in the IPT inspection method does not have an appropriate size to match the fine pixel pitches.

Both the individually separated panel and the large unseparated active matrix substrate include a wiring pattern called short ring in the frame region of the active matrix substrate. Short rings are provided to prevent the electrostatic breakdown caused by the static generated during the manufacturing process.

The short ring is connected to the gate lines, source lines, capacitance lines, power supply lines, control lines, and the like to prevent electrostatic breakdown that can occur during the substrate handling before or after processes such as attaching the alignment film, rubbing, bonding the substrates, and glass cutting. Normally, the short ring is removed in the scribing process or chamfering process after the panel is assembled.

For example, Patent Document 1 discloses a large unseparated active matrix substrate with a short ring formed thereon.

Patent Document 1 states that, as shown in FIG. 8, the short ring can be cut off during the manufacturing process of the liquid crystal display device after the process prone to be influenced by static electricity is complete, by cutting off a conductive short ring 114, which is electrically connecting terminal sections 113 of respective wiring lines to each other to equalize the potentials of the transparent electrodes and the wiring lines, using a laser beam radiated through a transparent substrate 111.

The short ring 114 is constituted of a band-shaped main line 115, which is disposed along the frame region of the transparent substrate 111, and numerous branch lines 116 that branch off from the main line 115 and that are connected to terminal sections 113 of respective wiring lines disposed on the transparent substrate 111.

Patent Document 2 discloses a large unseparated active matrix substrate with a short ring formed thereon.

As shown in FIG. 9, a conductive adhesive 123 is applied to at least one of a connection pattern 118 and a substrate connection pattern 121, the element substrate and the opposite substrate are bonded to each other face to face, and the conductive adhesive 123 electrically connects the connection pattern 118 and the substrate connection pattern 121 to each other.

As a result, according to Patent Document 2, a wiring layer 117 and an opposite electrode 119 can have about the same potential, and therefore breakdown of elements and damages to wiring lines and opposite electrode due to the electrical discharge between the two substrates can be prevented.

The opposite electrode 119 is connected to a region connection pattern 120, which is disposed to border each region into which liquid crystals are to be sealed. Further, the region connection pattern 120 is connected to the substrate connection pattern 121.

Patent Document 3 discloses a separated active matrix substrate with a short ring formed thereon.

As shown in FIG. 10, all or some row electrodes 127 and column electrodes 125 on the substrate are electrically short-circuited throughout all processes or some processes that are to be conducted during the time period starting immediately after the process in which two substrates 124 and 126 are bonded together and then are cut and separated into a prescribed shape, and ending before the connection to the driver circuit is established.

Because the row electrodes 127 and the column electrodes 125 are electrically connected with a conductive resin 129, static electricity does not unevenly build up on any particular electrode. This way, according to Patent Document 3, electrostatic breakdowns that can occur in active matrix type electrooptical devices after the cut and separation process can be prevented very easily, and the production yield can significantly be improved. The two substrates 124 and 126 are bonded together with an adhesive layer 128.

RELATED ART DOCUMENTS

Patent Documents

Patent Document 1: Japanese Patent Application Laid-Open Publication No. H4-221926 (published on Aug. 12, 1992)

Patent Document 2: Japanese Patent Application Laid-Open Publication No. H10-62735 (published on Mar. 6, 1998)

Patent Document 3: Japanese Patent Application Laid-Open Publication No. H2-251817 (published on Oct. 9, 1990)

SUMMARY OF THE INVENTION

Problems to be Solved by the Invention

The short ring in Patent Document 1 and the connection patterns 118, 120, and 121 in Patent Document 2, which correspond to the short ring, are formed simultaneously with wiring lines, electrodes, and the like to prevent the manufacturing process from becoming complex.

However, in the conventional manufacturing process that forms a short ring simultaneously with the wiring lines and electrodes, it was not possible to separately input a signal to wiring lines or to electrodes. Inspections and repairs on the large unseparated substrate, therefore, could not be performed.

Also, according to Patent Document 3, the row electrode 127 and the column electrode 125 have to be large enough so that the conductive resin 129 can be applied as the short ring. The technology, therefore, is not applicable to liquid crystal display devices having a narrow frame region.

Also, the conductive resin 129 can be physically peeled using tweezers or the like when the short ring is cut off. This technique, however, can scratch the surface of the row electrode 127 and the column electrode 125, causing leakages between terminals, and can result in poor connectivity and poor attachment due to contaminations. Also, if a resin film that can easily be peeled physically is formed during the manufacturing process, the film might come off during later processes, resulting in process contamination.

The present invention was devised to solve the problems described above, and is aiming at providing an active matrix substrate that can improve the display quality and a display device equipped with such an active matrix substrate.

Means for Solving the Problems

An active matrix substrate of the present invention includes thereon: a plurality of signal lines; a plurality of scan lines intersecting the signal lines; switching elements disposed near individual intersections of the signal lines and the scan lines; a plurality of input terminals for application of signals to the signal lines and scan lines; and short-circuit wiring disposed in an outer area with respect to the input terminals, wherein the short-circuit wiring includes a trunk wiring line and a plurality of branch wiring lines that branch off from the trunk wiring line and that are connected to the respective input terminals, and wherein the short-circuit wiring includes a plurality of separator sections that electrically isolate the individual input terminals and the trunk wiring line from each other.

According to the configuration described above, after the short-circuit wiring is formed simultaneously with pixel electrodes, array inspections and substrate repairs can be conducted on pixel electrodes with individual input terminals and a trunk wiring line electrically isolated from each other with separator sections. As a result, the display quality can be enhanced and production yield can be improved. Also, because the separator section is a gap that can be filled, a countermeasure against static electricity can easily be implemented by filling the separator section with a conductive material or the like.

The active matrix substrate of the present invention includes thereon: a plurality of signal lines as display wiring lines; a plurality of scan lines as display wiring lines, the scan lines intersecting the signal lines; switching elements disposed near individual intersections of the signal lines and the scan lines; and auxiliary wiring disposed in an outer area with respect to a region of the intersections of the signal lines and the scan lines, wherein the auxiliary wiring includes a trunk wiring line and a plurality of branch wiring lines that branch off from the trunk wiring line and that are connected to the respective display wiring lines, and wherein a plurality of separator sections that electrically isolate the individual display wiring lines and the trunk wiring line from each other are disposed on the auxiliary wiring.

According to the configuration described above, if a part of the signal lines or scan lines as display wiring lines breaks, a portion of the input signal of the broken display wiring line is diverted from the input side to the auxiliary wiring, and signals are inputted to the switching elements located beyond the breakage point from the non-input side. This way, broken scan lines or signal lines can be repaired and the display quality can be improved.

Effects of the Invention

The active matrix substrate of the present invention includes thereon: a plurality of signal lines; a plurality of scan lines intersecting the signal lines; switching elements disposed near individual intersections of the signal lines and the scan lines; a plurality of input terminals for application of signals to the signal lines and the scan lines; and short-circuit wiring disposed in an outer area with respect to the input terminals, wherein the short-circuit wiring includes a trunk wiring line and a plurality of branch wiring lines that branch off from the trunk wiring line and that are connected to the respective input terminals, and wherein the short-circuit wiring includes a plurality of separator sections that electrically isolate the individual input terminals and the trunk wiring line from each other.

According to the configuration described above, the input terminals can easily be short-circuited outside the process of pixel electrode formation. As a result, a countermeasure against static electricity can easily be implemented after the pixel electrodes are inspected and defects are repaired. This enhances the display quality and improves the production yield.

The active matrix substrate of the present invention includes thereon: a plurality of signal lines as display wiring lines; a plurality of scan lines as display wiring lines, the scan lines intersecting the signal lines; switching elements disposed near individual intersections of the signal lines and the scan lines; and auxiliary wiring disposed in an outer area with respect to a region of the intersections of the signal lines and the scan lines, wherein the auxiliary wiring includes a trunk wiring line and a plurality of branch wiring lines that branch off from the trunk wiring line and that are connected to the respective display wiring lines, and wherein a plurality of separator sections that electrically isolate the individual display wiring lines and the trunk wiring line from each other are disposed on the auxiliary wiring.

According to the configuration described above, if a part of the signal lines or scan lines as display wiring lines breaks, a portion of the input signal of the broken display wiring line is diverted from the input side to the auxiliary wiring, and signals are inputted to the switching elements located beyond the breakage point from the non-input side. This way, broken scan lines or signal lines can be repaired and the display quality can be improved.

A display device of the present invention includes the above-mentioned active matrix substrate.

Consequently, the present invention can provide an active matrix substrate that can improve the display quality and a display device equipped with such an active matrix substrate.

DETAILED DESCRIPTION OF EMBODIMENTS

Figure 1:
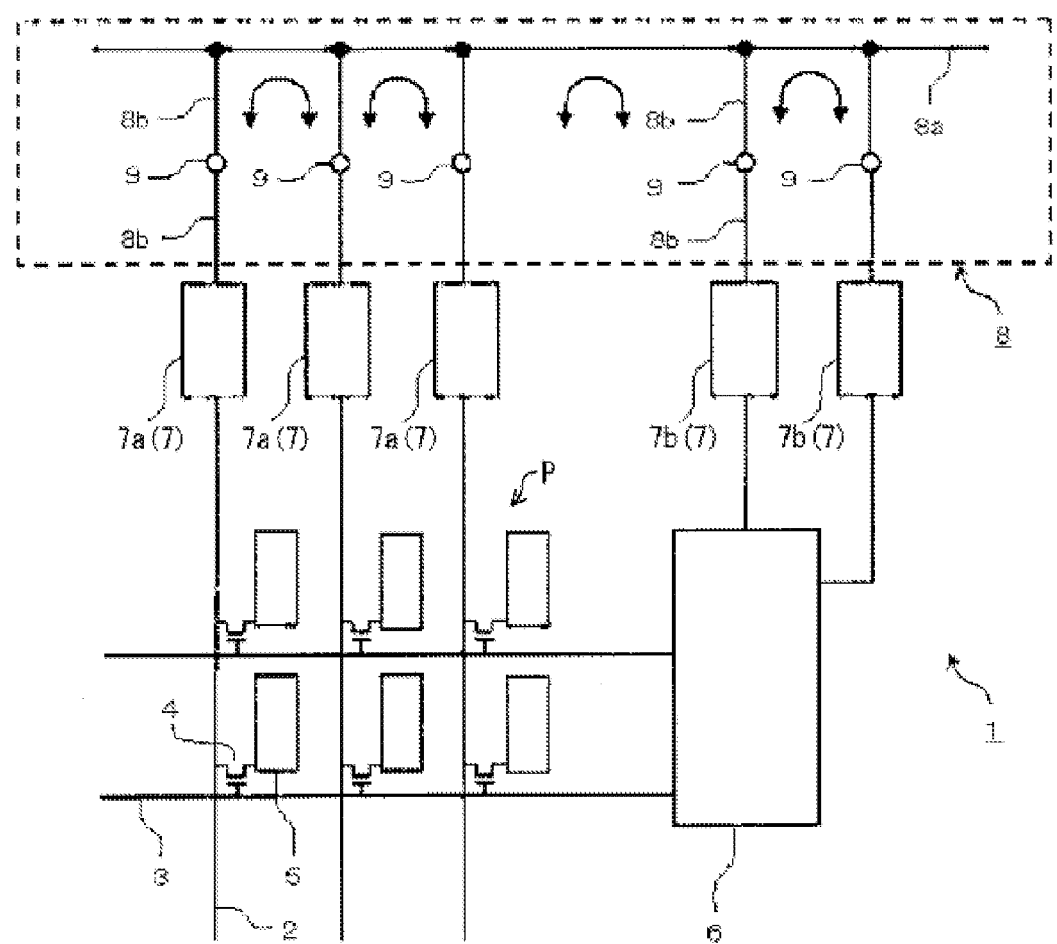
FIG. 1 is a plan view schematically showing the configuration of an active matrix substrate according to Embodiment 1 of the present invention.

Embodiments of the present invention are described in detail below with reference to figures. The present invention, however, is not limited to embodiments described below. In appended figures for the present invention, the same reference characters indicate the same section or an equivalent section.

Embodiment 1

FIG. 1 is as plan view schematically showing the configuration of an active matrix substrate according to Embodiment 1 of the present invention.

As shown in FIG. 1, an active matrix substrate 1 includes, as display wiring lines, a plurality of signal lines 2 and a plurality of scan lines 3 intersecting the signal lines 2, which are both disposed in a display region P of the substrate. The active matrix substrate 1 also includes switching elements 4 such as TFTs or the like disposed near individual intersections of the signal lines 2 and the scan lines 3, and pixel electrodes 5 connected to the respective switching elements 4.

Also included are a logic circuit 6 connected to the scan lines 3, input terminals 7a for inputting signals to the signal lines 2, and input terminals 7b for inputting signals to the scan lines 3 via the logic circuit 6. These are disposed in the area surrounding the display region P. Additionally, short-circuit wiring 8 is disposed in the outer area with respect to the input terminals 7 (input terminals 7a and 7b), and this wiring is for short-circuiting between individual input terminals 7.

Figure 2:
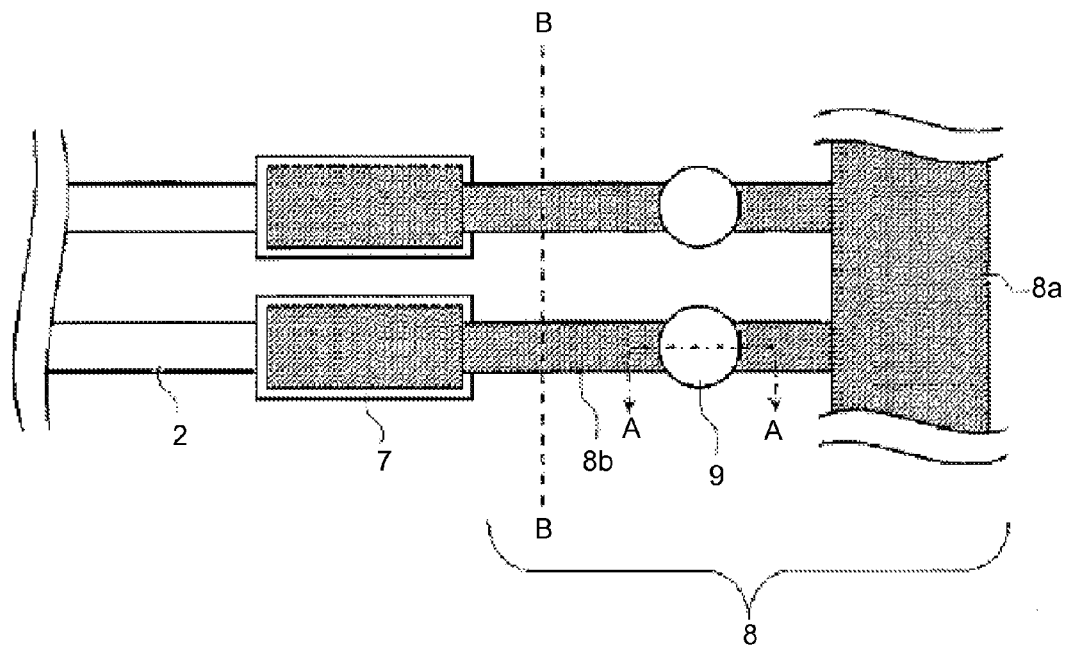
FIG. 2 is a plan view showing the configuration of short-circuit wiring according to Embodiment 1 of the present invention.

FIG. 2 is a plan view showing the configuration of the short-circuit wiring 8 according to Embodiment 1 of the present invention.

The short-circuit wiring 8 short-circuits between the input terminals 7 to prevent electrostatic breakdowns caused by static electricity generated during manufacturing processes. As shown in FIG. 1 and FIG. 2, the short-circuit wiring 8 has a trunk wiring line 8a and a plurality of branch wiring lines 8b that branch off from the trunk wiring line 8a and that are connected to respective input terminals 7.

The short-circuit wiring 8 also has a plurality of separator sections 9 that electrically isolate the input terminals 7 and the trunk wiring line 8a from each other. As shown in FIG. 2, for example, the separator sections 9 are disposed on the individual branch wiring lines 8b, which are connected to the input terminals 7 and to the trunk wiring line 8a. The separator section 9 is a gap between separated pieces of a branch wiring line 8b, where the gap is about 10 to 100 μm wide, for example, and can be filled later by applying a conductive material or the like. The separation sections 9 isolate the input terminals 7 from the trunk wiring line 8a.

The trunk wiring line 8a and the branch wiring lines 8b of the short-circuit wiring 8 are made of conductive materials such as Al, Ta, Mo, Cr, or ITO, but may be made of the same material as the pixel electrodes 5 and formed simultaneously with the pixel electrodes 5 so that the manufacturing process does not become complex. Also, the separator section 9 may be formed simultaneously with the trunk wiring line 8a and branch wiring lines 8b of the short-circuit wiring 8 using a pattern.

On the active matrix substrate 1 of the present invention, the input terminals 7 and the trunk wiring line 8a remain electrically isolated from each other by the separator sections 9 after the short-circuit wiring 8 is formed simultaneously with the pixel electrodes 5. This allows the array inspection on pixel electrodes 5 and substrate repair. Also, because the separator section 9 is a gap that can be filled, a countermeasure against static electricity can easily be implemented by filling the separator section 9 using a conductive material and the like.

As a result, pixel electrodes 5 can be inspected using a technique that electrically checks the presence of defect for the individual pixels of the active matrix substrate 1, and the category and coordinates of the defect can be determined quickly and accurately. Once the defect is repaired based on this information on the defect, a countermeasure against electrostatic breakdowns that can make a serious impact in subsequent manufacturing processes can easily be implemented. The countermeasure can enhance the display quality and improve the production yield.

The short-circuit wiring 8 of the active matrix substrate 1 is cut off along the broken line B-B of FIG. 2. This way, in the end, the plurality of input terminals 7 are isolated from the short-circuit wiring 8, and signals can then be inputted to the input terminals 7.

Figure 3:
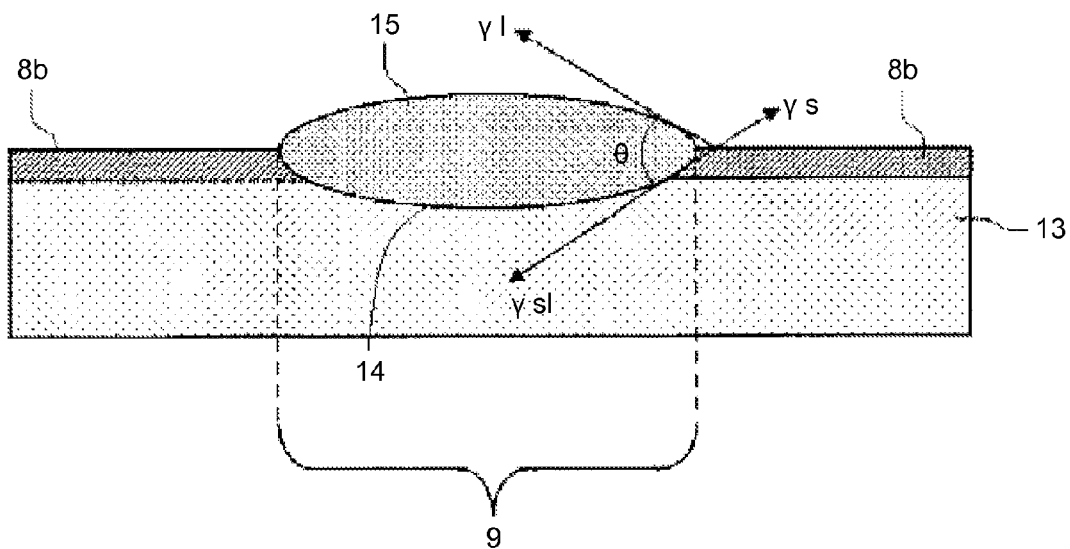
FIG. 3 is a cross-sectional view showing the configuration of a separator section of the short-circuit wiring according to Embodiment 1 of the present invention.

FIG. 3 is a cross-sectional view of the separator section 9 taken along the broken line A-A of FIG. 2.

When implementing a countermeasure against the static electricity, as shown in FIG. 3, the separator section 9 can be filled with a conductive ink 15, for example, to connect the separated pieces of the branch wiring line 8b together to establish the electrical continuity. As a result, through the branch wiring lines 8b corresponding to the respective plurality of input terminals 7, the input terminals 7 are short-circuited to the trunk wiring line 8a.

Consequently, the potentials at the plurality of input terminals 7 do not easily become uneven, and the insulating layer breakdown caused by a surge current, where the static charge accumulated during the subsequent liquid crystal manufacturing processes is discharged at a burst, or the like can be prevented from occurring.

As the conductive ink 15 to be applied to the separator section 9, a material with metallic nanoparticles, such as silver, dispersed in the medium is used, because such a material can have a film thickness of several μm or less and therefore when the active matrix substrate is bonded to an opposite substrate, the material does not touch the opposite substrate.

Also, the surface of the metallic nanoparticles contained in the conductive ink 15 to be applied to the separator section 9 is covered by a low-molecular layer, so that clumping of the particles is suppressed. This covering layer leaves the metallic nanoparticles and evaporates together with the medium after being subjected to a short heat treatment that lasts for a few minutes at a low temperature of about 100° C. to 200° C. This technique forms a conductive pattern made of metallic nanoparticles. As a result, a substrate connected to the short ring can be obtained without making the manufacturing process complex.

As shown in FIG. 3, when the surface tension of liquid (conductive ink 15) is γl, the surface tension of solid (insulating film 13, which is the base) is γs, and the interfacial tension of solid/liquid is γsl, the contact angle θ of the liquid that is in contact with the solid can be expressed in Equation 1 shown below.

<Equation 1>

$$\cos \theta = (\gamma s - \gamma sl)/\gamma l \qquad \text{Equation 1}$$

As shown in Equation 1, if a liquid has a better wettability and a higher adhesion with the base, the contact angle θ of the liquid becomes smaller and the liquid spreads wider.

The contact angle θ between the base (insulating film 13) and the applied material (conductive ink 15) can be made smaller by reducing the surface tension of the applied material (γl). However, even if the applied material strongly adheres to the base, the benefit is nullified if the wettability increases to the degree that the applied material spreads across the space between wiring lines on the substrate.

On the other hand, the contact angle θ between the base and the applied material can be made larger by increasing the surface tension of the applied material (γl) or decreasing the surface tension of the base (γs). However, the adherence of the applied material to the base will be lost if the applied material is subjected to a water-repellent surface treatment or the like such as halogenation, for example.

Therefore, the viscosity of the applied material is adjusted as appropriate in consideration of the shape the applied material will take once it is solidified and the degree of adherence of the applied material to the base.

In general, lower alcohol with about 6 to 10 carbons or a water-based solution containing additives whose amount is adjusted to achieve a viscosity equivalent to that of the lower alcohol is used as the medium of the nanoparticle material.

For example, when the applied material is heated, the medium of the applied material and the organic compound that was coating the metallic nanoparticles vaporizes and evaporates. The metallic nanoparticles, which are left behind and now naked, clump together immediately after they touch each other even at a temperature below the melting point. As a result, an electrical conductivity equivalent to the bulk conductivity can be realized.

On the active matrix substrate 1, if the conductive ink 15 applied extends out of the separator section 9, problems such as leakage failure can arise. To suppress the spread of the conductive ink 15, as shown in FIG. 3, the separator section 9 has a concave surface bottom, which is a recess 14 that looks like the bottom of a mortar. The recess 14 can be formed, for example, by exposure and development processes on an insulating film 13, which is the base made of a photocurable resin, for example.

With the recess 14, the conductive ink 15 applied to the separator section 9 slides down along the slope of the mortar-shaped recess and gathers at the center of the bottom. As a result, the contact angle θ between the conductive ink 15 and the insulating film 13, which is the base, increases. Consequently, the force that tries to spread the applied material outward is suppressed.

As described above, when the conductive ink 15, which includes metallic nanoparticles, is applied to the separator section 9 having the recess 14, a fine conductive pattern with a minimum line width of about several 10 μm can be formed. Also, because the conductive ink 15 is prevented from spreading outside the separator section 9, problems such as leakage failure can be avoided.

Embodiment 2

Figure 4:
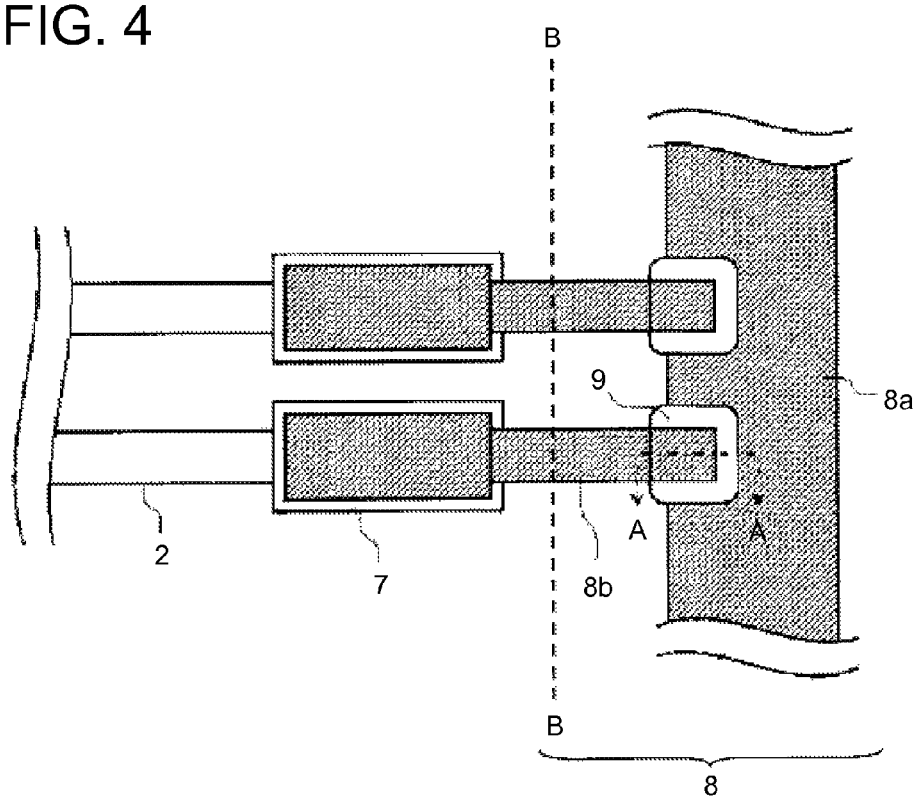
FIG. 4 is a plan view showing the configuration of short-circuit wiring according to Embodiment 2 of the present invention.
Figure 5:
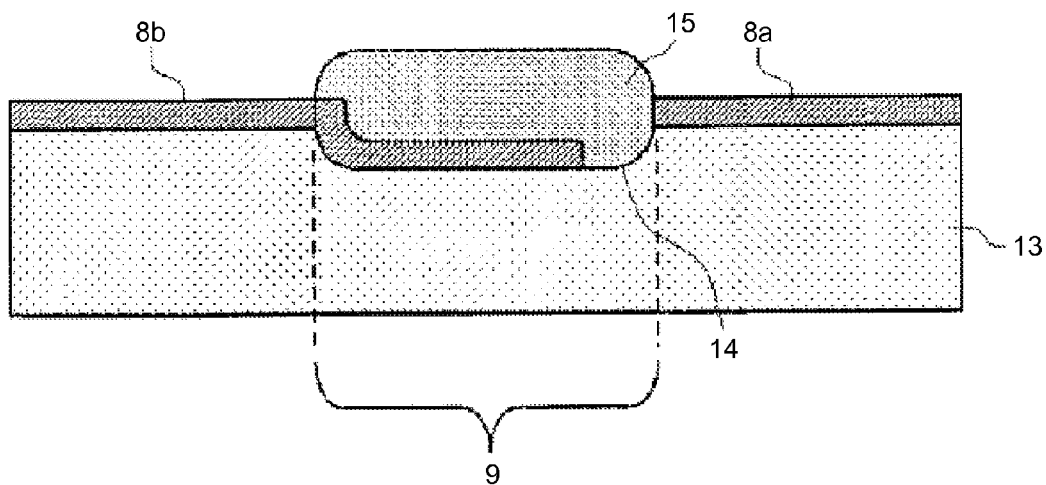
FIG. 5 is a cross-sectional view showing the configuration of the separator section of the short-circuit wiring according to Embodiment 2 of the present invention.

FIG. 4 is a plan view showing the configuration of the short-circuit wiring of the active matrix substrate according to Embodiment 2 of the present invention. FIG. 5 is a cross-sectional view of the separator section taken along the broken line A-A of FIG. 4.

The only differences between this embodiment and Embodiment 1 are the location of the separator section 9 on the short-circuit wiring 8 and the shape of the separator section 9. The rest of the configuration details are the same, and therefore detailed description of them is omitted.

As shown in FIG. 4, the short-circuit wiring 8 of the active matrix substrate according to Embodiment 2 includes a trunk wiring line 8a and a plurality of branch wiring lines 8b that branch off from the trunk wiring line 8a and that are connected to the respective input terminals 7. Also, in the short-circuit wiring 8, the separator section 9 is provided at every fork of the trunk wiring line 8a to electrically isolate the input terminals 7 from the trunk wiring line 8a.

The trunk wiring line 8a has a wide line width, and a separator section 9 with a large, rectangular-shaped recess 14 is formed at the fork of the trunk wiring line 8a.

As shown in FIG. 5, because the recess 14 of the separator section 9 is rectangular, the end portion of the branch wiring line 8b can extend into the recess 14. This configuration facilitates the wire installation and increases the contact area with the conductive ink 15, which improves the electrical connection. Also, because the entire length of the branch wiring line 8b can be made shorter, the portion to be discarded, i.e., the portion outside the cutting line indicated by the broken line B-B of FIG. 4, is minimum. As a result, the glass substrate and other materials can be fully used, instead of being wasted.

Embodiment 3

Figure 6:
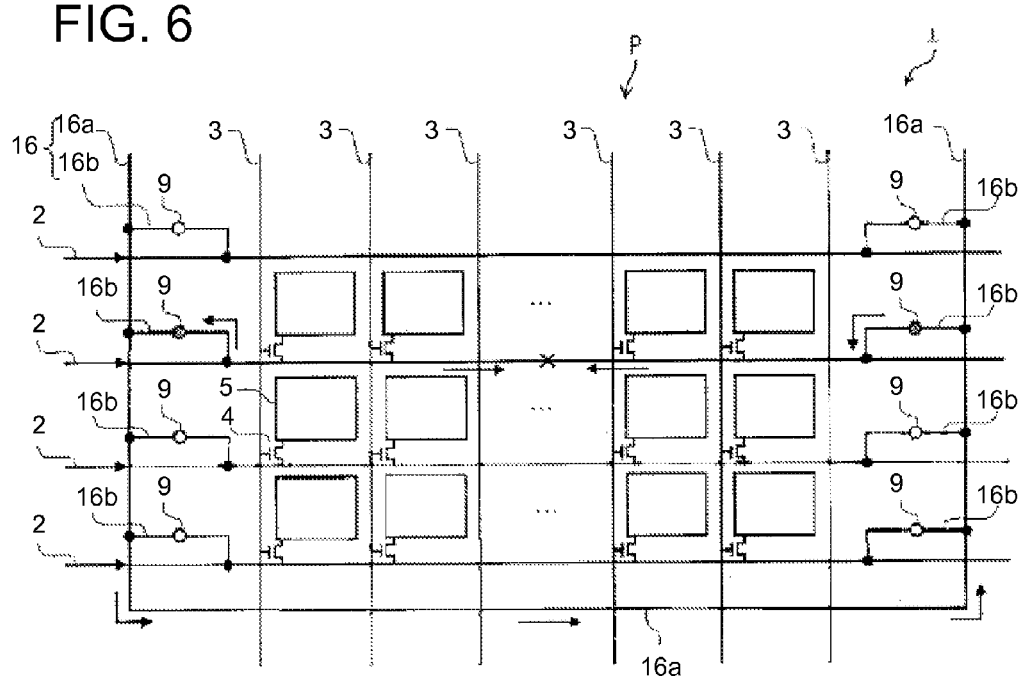
FIG. 6 is a plan view schematically showing the configuration of an active matrix substrate according to Embodiment 3 of the present invention.

FIG. 6 is a plan view schematically showing the configuration of an active matrix substrate according to Embodiment 3 of the present invention.

The active matrix substrate according to Embodiment 3 employs the configuration of the separator section in the short-circuit wiring according to Embodiment 1 and Embodiment 2 for the auxiliary wiring, which is used to repair broken scan lines and signal lines.

As shown in FIG. 6, an active matrix substrate 1 of Embodiment 3 includes, as display wiring lines, a plurality of signal lines 2 and a plurality of scan lines 3 intersecting the signal lines 2, which are both disposed in a display region P of the active matrix substrate 1.

The active matrix substrate 1 also includes switching elements 4 such as TFTs or the like disposed near the individual intersections of the signal lines 2 and the scan lines 3, and pixel electrodes 5 connected to the respective switching elements 4.

If a part of the display wiring lines breaks, the auxiliary wiring 16 diverts signals from the point of the breakage to the switching elements 4 disposed down the line to input the signals from a non-input side.

The auxiliary wiring 16 includes a trunk wiring line 16a that diverts signals from the input side to the non-input side of the display wiring lines, and a plurality of branch wiring lines 16b that branch off from the trunk wiring line 16a and that are connected to the input side or the non-input side of the display wiring lines. The auxiliary wiring 16 is formed, for example, of the same transparent conductive film that the pixel electrodes 5 are made of.

Also, the auxiliary wiring 16 includes a plurality of separator sections 9 that electrically isolate the display wiring lines from the trunk wiring line 16a. As shown in FIG. 6, the separator section 9 is a gap that separates each branch wiring line 16b from the trunk wiring line 16a, where the gap is about 10 to 100 μm wide, for example, and can be filled later by applying a conductive material or the like.

In the configuration described above, if a portion of a signal line 2 breaks, for example, at location x shown in FIG. 6, conductive ink 15 is applied to a separator section 9 disposed on a branch wiring line 16b connected to the input side of the broken signal line 2 and to a separator section 9 disposed on a branch wiring line 16b connected to the non-input side of the broken signal line 2 to make the branch wiring lines 16b conductive.

As a result, as indicated by the arrows in FIG. 6, a portion of the input signal of the broken signal line 2 is diverted from the input side to the auxiliary wiring 16, so that signals can be inputted to the switching elements 4 beyond the breakage point (x) from the non-input side.

Figure 7:
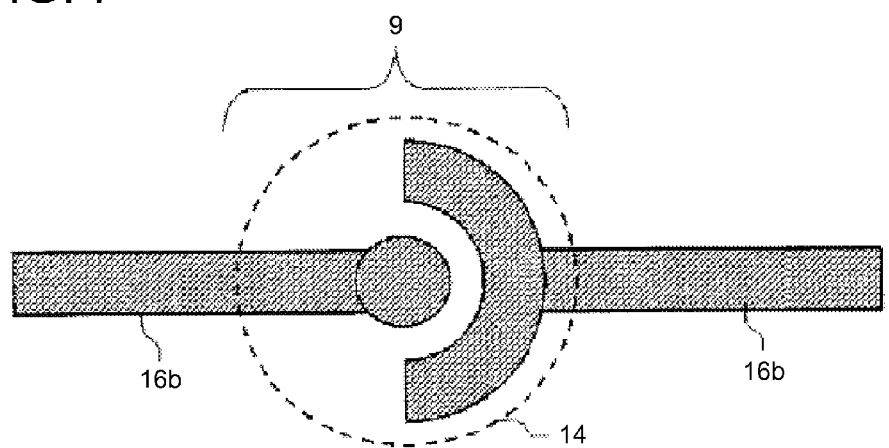
FIG. 7 is a plan view showing the configuration of a separator section of an auxiliary wiring according to Embodiment 3 of the present invention.
Figure 8:
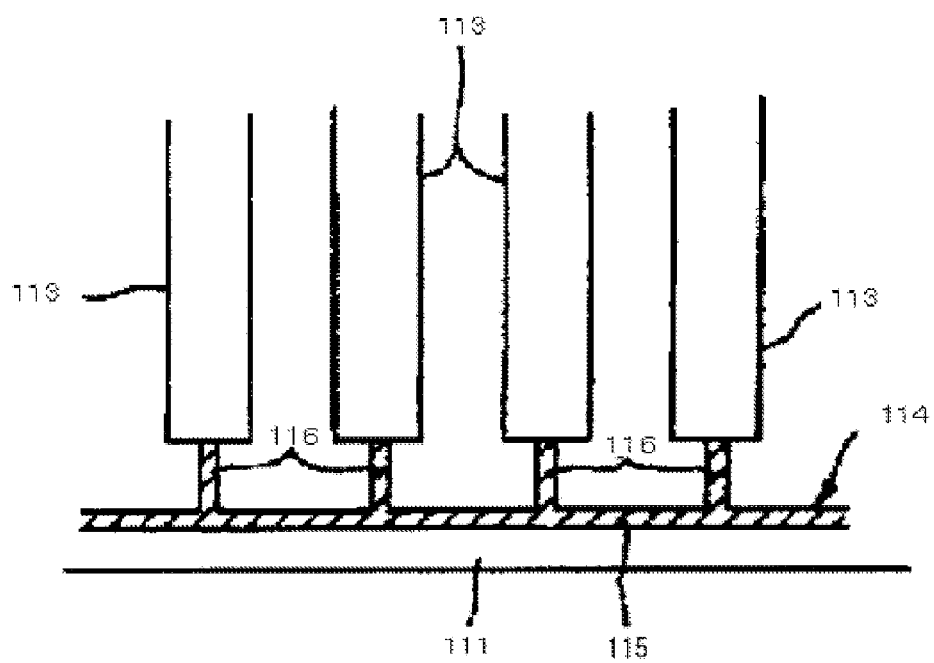
FIG. 8 is a plan view showing the configuration of a short ring according to Patent Document 1.
Figure 9:
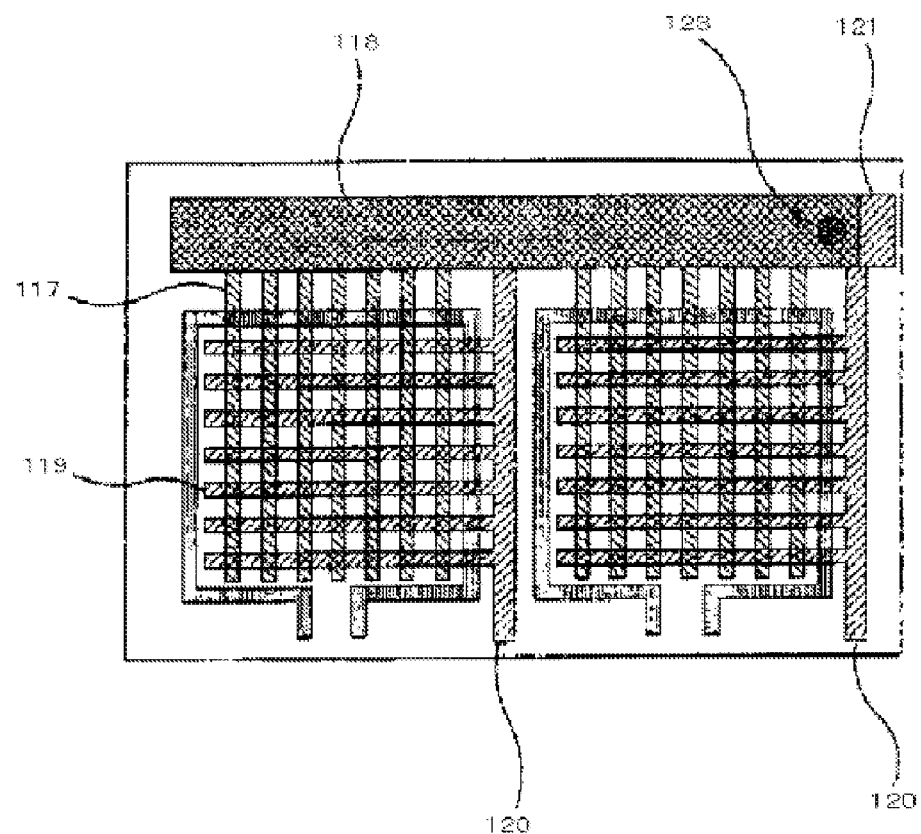
FIG. 9 is a plan view showing the configuration of a short ring according to Patent Document 2.
Figure 10:
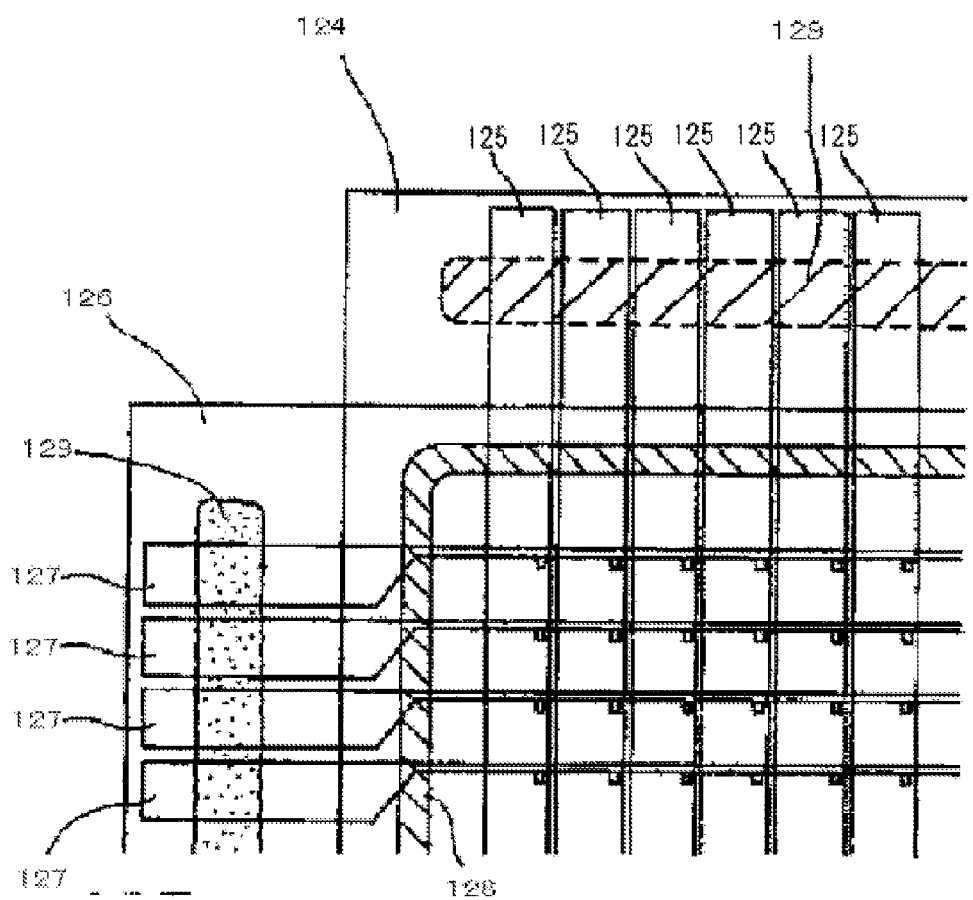
FIG. 10 is a plan view showing the configuration of a short ring according to Patent Document 3.

FIG. 7 is a plan view of the separator section 9 provided on the branch wiring line 16b. The separator section 9 may have a configuration similar to Embodiment 1 or Embodiment 2. In another possible configuration, as shown in FIG. 7, for example, the recess 14 of the separator section 9 is made into a globular shape, and one end portion of the branch wiring line 16b is made into a U-shape along the edge of the recess 14, and the other end portion of the branch wiring line 16b is disposed at the center of the recess 14.

The composition of the conductive ink is very strictly limited. The wiring connection for repairs is made close to the display region, and therefore no residue that can cause display quality deterioration after firing should be allowed.

According to the configuration of the separator section 9 of FIG. 7, the applied conductive ink can shrink into a globular shape. Due to the restricted composition, the conductive ink can reliably connect the both ends of the branch wiring line 16b together even if the surface tension is relatively high and the separator section 9 is made small. This way, the separator section 9 can be disposed in an area such as in the auxiliary wiring 16, where fine lines are disposed with narrow spaces between them.

When a signal line 2 and a scan line 3 are short-circuited and a "cross" of the lines is affected, the problem is fixed by cutting the signal line 2 using a laser repair device on both sides of the point of the short-circuit. This way, after the signal line 2 is cut off to isolate the cross-shaped point of leakage, the auxiliary wiring can be connected according to the above-mentioned technique to bypass the point of breakage of the signal line 2.

Embodiments of the present invention are described above. The present invention, however, is not limited to the above-mentioned embodiments. Instead, it may be modified in various ways. For example, the configuration of the separator section of one of the embodiments may be combined with the configuration of separator section of another embodiment. Examples in which the separator section is used in the short-circuit wiring and in the auxiliary wiring were described above. However, the present invention may be applied to a wide variety of wiring lines where selective connections are needed.

The active matrix substrate of the present invention includes thereon: a plurality of signal lines; a plurality of scan lines intersecting the signal lines; switching elements disposed near individual intersections of the signal lines and the scan lines; a plurality of input terminals for application of signals to the signal lines and the scan lines; and short-circuit wiring disposed in an outer area with respect to the input terminals, wherein the short-circuit wiring includes a trunk wiring line and a plurality of branch wiring lines that branch off from the trunk wiring line and that are connected to the respective input terminals, and wherein the short-circuit wiring includes a plurality of separator sections that electrically isolate the individual input terminals and the trunk wiring line from each other.

According to the configuration described above, after the short-circuit wiring is formed simultaneously with pixel electrodes, array inspections and substrate repairs can be conducted on pixel electrodes with individual input terminals and a trunk wiring line electrically isolated from each other with separator sections. As a result, the display quality can be enhanced and production yield can be improved. Also, because the separator section is a gap that can be filled, a countermeasure against static electricity can easily be implemented by filling the separator section with a conductive material or the like.

The active matrix substrate of the present invention includes thereon: a plurality of signal lines as display wiring lines; a plurality of scan lines as display wiring lines, the scan lines intersecting the signal lines; switching elements disposed near individual intersections of the signal lines and the scan lines; and auxiliary wiring disposed in an outer area with respect to a region of the intersections of the signal lines and the scan lines, wherein the auxiliary wiring includes a trunk wiring line and a plurality of branch wiring lines that branch off from the trunk wiring line and that are connected to the respective display wiring lines, and wherein a plurality of separator sections that electrically isolate the individual display wiring lines and the trunk wiring line from each other are disposed on the auxiliary wiring.

According to the configuration described above, if a part of the signal lines or scan lines as display wiring lines breaks, a portion of the input signal of the broken display wiring line is diverted from the input side to the auxiliary wiring, and signals are inputted to the switching elements located beyond the breakage point from the non-input side. This way, the broken scan line or signal line can be repaired and the display quality can be improved.

The active matrix substrate of the present invention may have the separator sections disposed on the individual branch wiring lines.

The active matrix substrate of the present invention may include the separator sections at individual forks of the trunk wiring line.

According to the configuration described above, the entire length of the branch wiring lines can be made shorter, and therefore the portion to be discarded is minimum. As a result, the glass substrate and other materials can be fully used, instead of being wasted.

The active matrix substrate of the present invention is preferably configured such that the separator section is formed into a recess.

According to the configuration described above, the material applied to the separator section slides down along the slope of the mortal-shaped recess and gathers at the center of the bottom. As a result, the contact angle between the applied material and the base increases, and consequently, the force that tries to spread the applied material outward is suppressed.

The active matrix substrate of the present invention is preferably configured such that the separator section is filled with a conductive ink.

A display device of the present invention is equipped with the above-mentioned active matrix substrate.

INDUSTRIAL APPLICABILITY

The present invention can suitably be applied for display devices such as liquid crystal display devices.

DESCRIPTION OF REFERENCE CHARACTERS 1 active matrix substrate
2 signal line
3 scan line
4 switching element
5 pixel electrode
6 logic circuit
7, 7a, 7b input terminal
8 short-circuit wiring
8a trunk wiring line
8b branch wiring line
9 separator section
13 insulating film
14 recess
15 conductive ink
16 auxiliary wiring
111 transparent substrate
113 terminal section
114 short ring
117 wiring layer
118 connection pattern
119 opposite electrode
120 region connection pattern
121 substrate connection pattern
122 sealing member
123 conductive adhesive
124 top substrate
125 column electrode
126 bottom substrate
127 row electrode
128 adhesive layer
129 conductive resin

The invention claimed is:

1. An active matrix substrate, comprising thereon:
a plurality of signal lines; a plurality of scan lines intersecting said signal lines;
switching elements disposed near individual intersections of said signal lines and said scan lines;
a plurality of input terminals for application of signals to said signal lines and said scan lines; and
short-circuit wiring disposed in an outer area with respect to said input terminals,
wherein said short-circuit wiring includes a trunk wiring line and a plurality of branch wiring lines that branch off from said trunk wiring line and that are connected to said respective input terminals,
wherein said short-circuit wiring includes a plurality of separator sections that electrically isolate said individual input terminals and said trunk wiring line from each other, and
wherein said separator sections are filled with a conductive ink.

2. An active matrix substrate, comprising thereon:
a plurality of signal lines as display wiring lines;
a plurality of scan lines as display wiring lines, said scan lines intersecting said signal lines;
switching elements disposed near individual intersections of said signal lines and said scan lines; and
auxiliary wiring disposed in an outer area with respect to a region of the intersections of said signal lines and said scan lines,
wherein said auxiliary wiring includes a trunk wiring line and a plurality of branch wiring lines that branch off from said trunk wiring line and that are connected to said respective display wiring lines,
wherein a plurality of separator sections that electrically isolate said individual display wiring lines and said trunk wiring line from each other are disposed on said auxiliary wiring, and
wherein said separator sections are filled with a conductive ink.

3. The active matrix substrate according to claim 1, wherein said separator sections are disposed on said individual branch wiring lines.

4. The active matrix substrate according to claim 1, wherein said separator sections are disposed at individual forks of said trunk wiring line.

5. The active matrix substrate according to claim 1, wherein said separator section is formed into a recess.

6. A display device equipped with the active matrix substrate according to claim 1.

7. The active matrix substrate according to claim 2, wherein said separator sections are disposed on said individual branch wiring lines.

8. The active matrix substrate according to claim 2, wherein said separator sections are disposed at individual forks of said trunk wiring line.

9. The active matrix substrate according to claim 2, wherein said separator section is formed into a recess.

10. A display device equipped with the active matrix substrate according to claim 2.

* * * * *